(12) United States Patent
Stillinger et al.

(10) Patent No.: US 8,562,004 B2
(45) Date of Patent: Oct. 22, 2013

(54) CHILDREN'S KNEE BOARDS AND METHODS OF RIDING THE SAME

(75) Inventors: Scott H. Stillinger, Monte Sereno, CA (US); Kathryn Kelsey Anne Stillinger, Los Gatos, CA (US)

(73) Assignee: Acorn Products, LLC, Monte Sereno, CA (US)

( * ) Notice: Subject to any disclaimer, the term of this patent is extended or adjusted under 35 U.S.C. 154(b) by 810 days.

(21) Appl. No.: 12/581,738

(22) Filed: Oct. 19, 2009

(65) Prior Publication Data
US 2010/0096823 A1    Apr. 22, 2010

Related U.S. Application Data

(60) Provisional application No. 61/196,814, filed on Oct. 20, 2008.

(51) Int. Cl.
*B62M 1/00*    (2010.01)
*B62M 1/16*    (2006.01)

(52) U.S. Cl.
USPC ............... 280/87.021; 280/87.01; 280/87.041

(58) Field of Classification Search
USPC ................................. 280/87.01, 87.021, 87.04
See application file for complete search history.

(56) References Cited

U.S. PATENT DOCUMENTS

| | | | | |
|---|---|---|---|---|
| 1,668,623 A | * | 5/1928 | Avril | 280/87.021 |
| 2,615,722 A | * | 10/1952 | Johnson | 280/7.14 |
| 2,965,387 A | * | 12/1960 | Brunzell | 280/87.01 |
| 3,870,334 A | * | 3/1975 | Cole | 280/87.01 |
| 4,134,599 A | | 1/1979 | DiMille et al. | |
| 4,166,630 A | * | 9/1979 | Sullivan et al. | 280/87.021 |
| 4,930,796 A | | 6/1990 | Harrod | |
| D382,617 S | | 8/1997 | Oak | |
| 6,276,700 B1 | | 8/2001 | Way et al. | |
| 2002/0070519 A1 | * | 6/2002 | Rappaport | 280/87.041 |
| 2006/0279058 A1 | | 12/2006 | Padington et al. | |
| 2007/0170666 A1 | * | 7/2007 | Chen | 280/1.181 |

FOREIGN PATENT DOCUMENTS

WO    WO 2009/041933    4/2009

* cited by examiner

*Primary Examiner* — J. Allen Shriver, II
*Assistant Examiner* — Bryan Evans
(74) *Attorney, Agent, or Firm* — Dascenzo Intellectual Property Law, P.C.

(57) ABSTRACT

Knee boards for riding in a kneeling position on a ground surface and methods of riding the same. Knee boards include a body with a knee support region, front and rear wheel assemblies, and a gripping member. The body defines an open kick region laterally adjacent to the knee support region. The open kick region permits a user to extend his/her foot to contact and kick the ground surface to propel the knee board and the user along the ground. Some knee boards include a left knee support region and a right knee support region laterally spaced from the left knee support region, and which collectively define the open kick region therebetween. Some knee boards include a central knee support region and a body that defines a left kick region and a right kick region to the left and right of the knee support region, respectively.

25 Claims, 4 Drawing Sheets

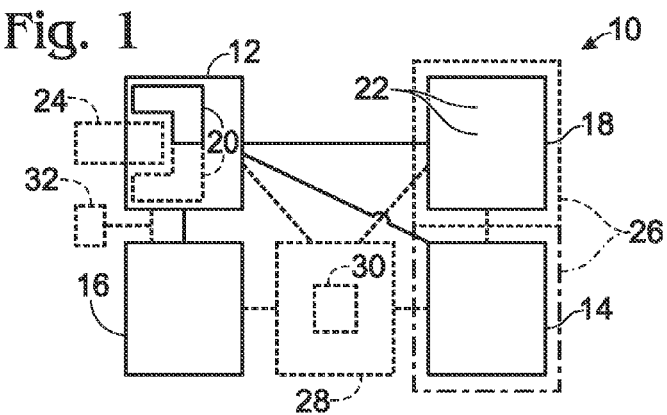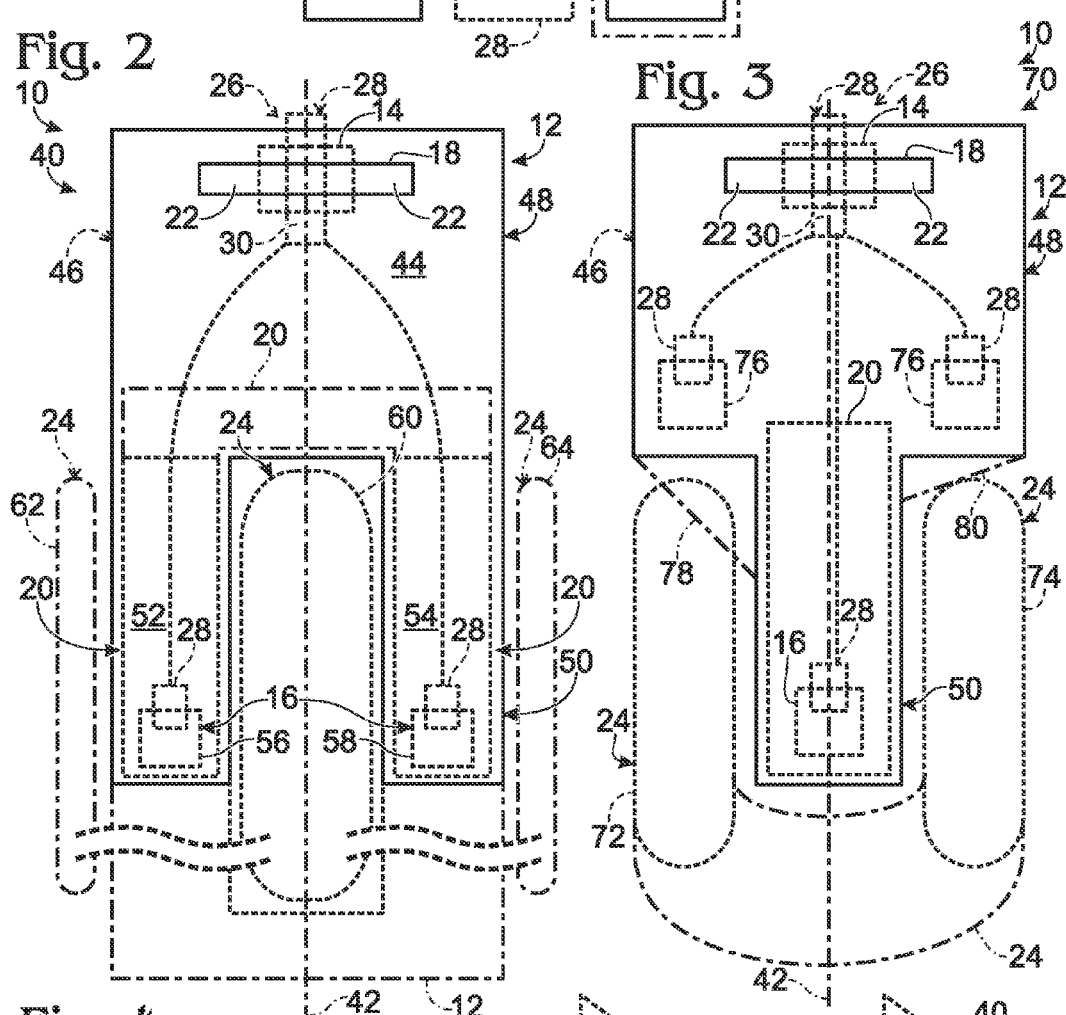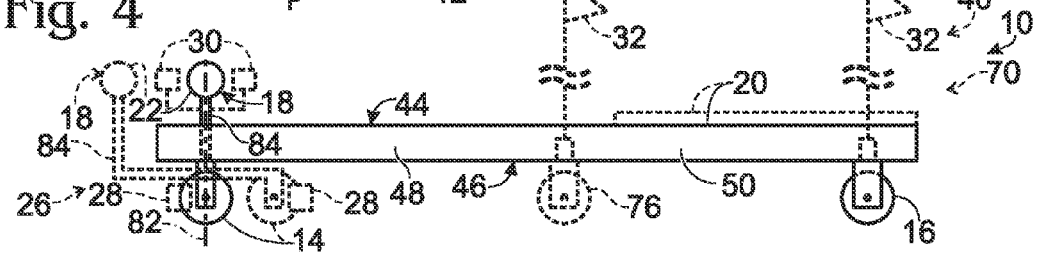

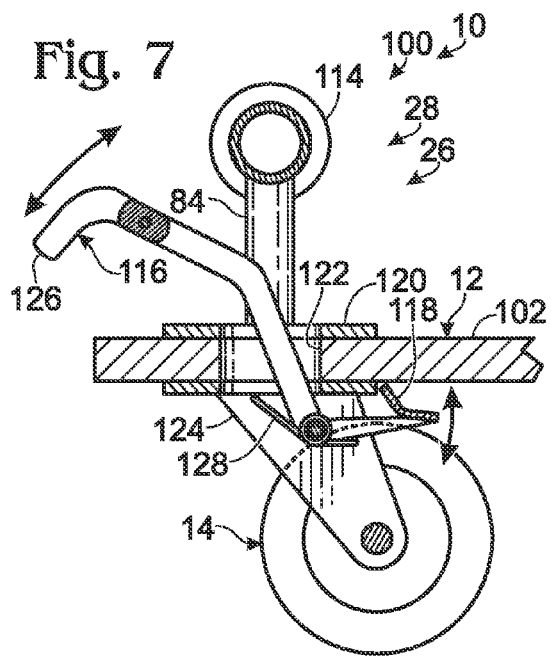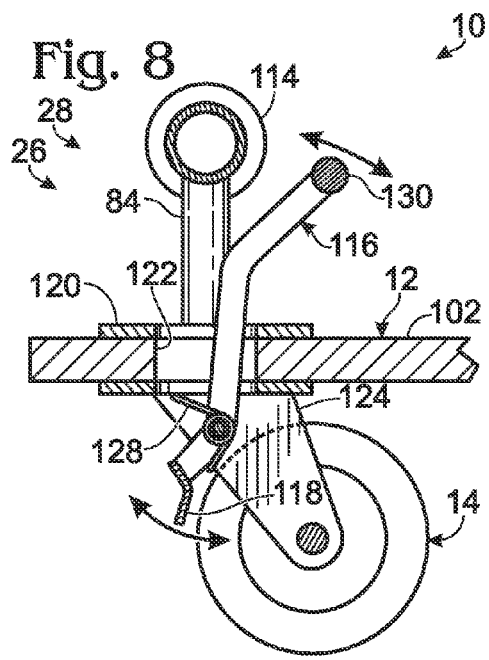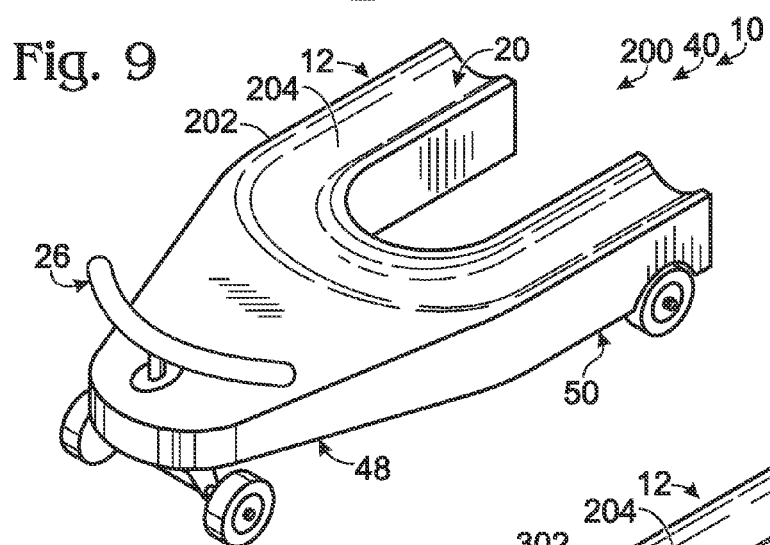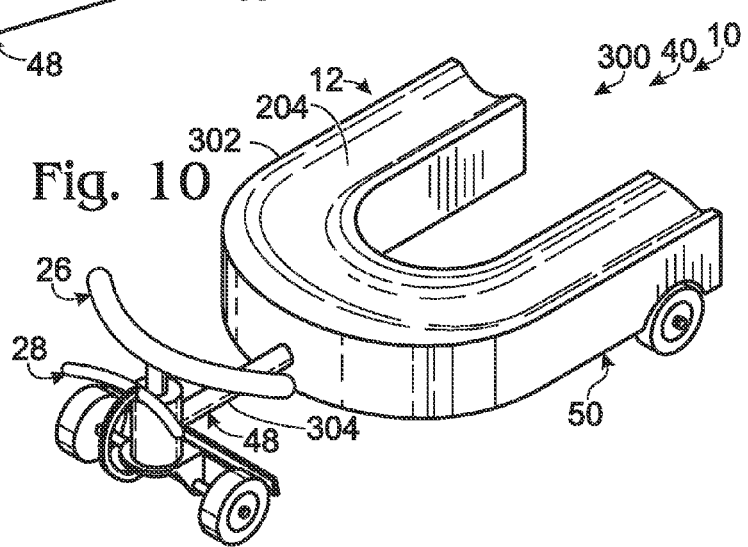

CHILDREN'S KNEE BOARDS AND METHODS OF RIDING THE SAME

RELATED APPLICATION

This application claims priority to U.S. Provisional Patent Application Ser. No. 61/196,814, entitled "A KNEE BOARD AND METHOD" and filed on Oct. 20, 2008, the complete disclosure of which is hereby incorporated by reference.

FIELD OF THE DISCLOSURE

The present disclosure is directed to knee boards, and more particularly to knee boards for riding in a kneeling position on a ground surface and to methods of riding the same.

BACKGROUND OF THE DISCLOSURE

A variety of recreational self-propelled wheeled vehicles are known, including bicycles, skateboards, scooters, and the like. Bicycles and some scooters generally provide a seat for a user to sit on, and are propelled by the user pedaling in a circular motion. Skateboards and other scooters, on the other hand, utilize a platform for a user to stand on, and are propelled by the user kicking, or pumping, the ground with the user's foot. Each is unique in its own way, and they provide different degrees of enjoyment and effectiveness for transportation. Such self-propelled vehicles are often used for recreational and/or sporting purposes, such as by adult and/or child users. A further type of self-propelled wheeled vehicle is a knee board, which similar to bicycles, skateboards, and scooters, may be ridden by riders of different sizes and ages and which may be used for recreational and/or sporting purposes. Whereas a user stands on a rider platform and/or sits on a seat when riding a bicycle, scooter, or skateboard, a user rides on a knee board by kneeling on the knee board's body, such as knee-supporting region thereof, and propels the knee board by kicking, or pumping, against the ground surface with the user's foot.

SUMMARY OF THE DISCLOSURE

Children's knee boards according to the present disclosure are designed to be ridden by a child in a kneeling position. The knee boards include a body with a knee support region, a front wheel assembly, a rear wheel assembly, and a gripping member. The body of a children's knee board according to the present disclosure defines an open kick region laterally adjacent to at least a portion of the knee support region. The open kick region permits a user to extend his/her foot next to the knee support region and through the open kick region to contact the ground surface, and subsequently kick, or pump, the ground to propel the knee board and the user along the ground while kneeling on the body of the knee board. In some embodiments, the body includes a left knee support region and a right knee support region laterally spaced from the left knee support region to define at least a portion of the open kick region between the left knee support region and the right knee support region. In other embodiments, the knee support region is positioned along the longitudinal axis of the body and the open kick region includes a left kick region and a right kick region, such that the knee support region is positioned between the left kick region and the right kick region. Some embodiments include a steering assembly operatively coupled to the front wheel assembly to permit the user to steer the knee board with the gripping member. Some embodiments include a braking assembly configured to restrict rotation of one or more of the wheels of the knee board responsive to the user engaging an actuator.

BRIEF DESCRIPTION OF THE DRAWINGS

FIG. 1 is a block diagram schematically illustrating children's knee boards according to the present disclosure.

FIG. 2 is a schematic top plan view illustrating illustrative, non-exclusive examples of children's knee boards according to the present disclosure.

FIG. 3 is a schematic top plan view illustrating illustrative, non-exclusive examples of children's knee boards according to the present disclosure.

FIG. 4 is a schematic side elevation view illustrating illustrative, non-exclusive examples of children's knee boards according to the present disclosure.

FIG. 7 is a fragmentary cross-sectional side view of a portion of the children's knee board of FIGS. 5-6, illustrating the optional steering assembly and the optional braking assembly.

FIG. 8 is a fragmentary cross-sectional side view of a portion of another illustrative, non-exclusive example of a children's knee board according to the present disclosure, the illustrated knee board including an optional steering assembly and an optional braking assembly.

FIG. 9 is an isometric view of another illustrative, non-exclusive example of a children's knee board according to the present disclosure.

FIG. 10 is an isometric view of another illustrative, non-exclusive example of a children's knee board according to the present disclosure.

DETAILED DESCRIPTION AND BEST MODE OF THE DISCLOSURE

Figure 5:
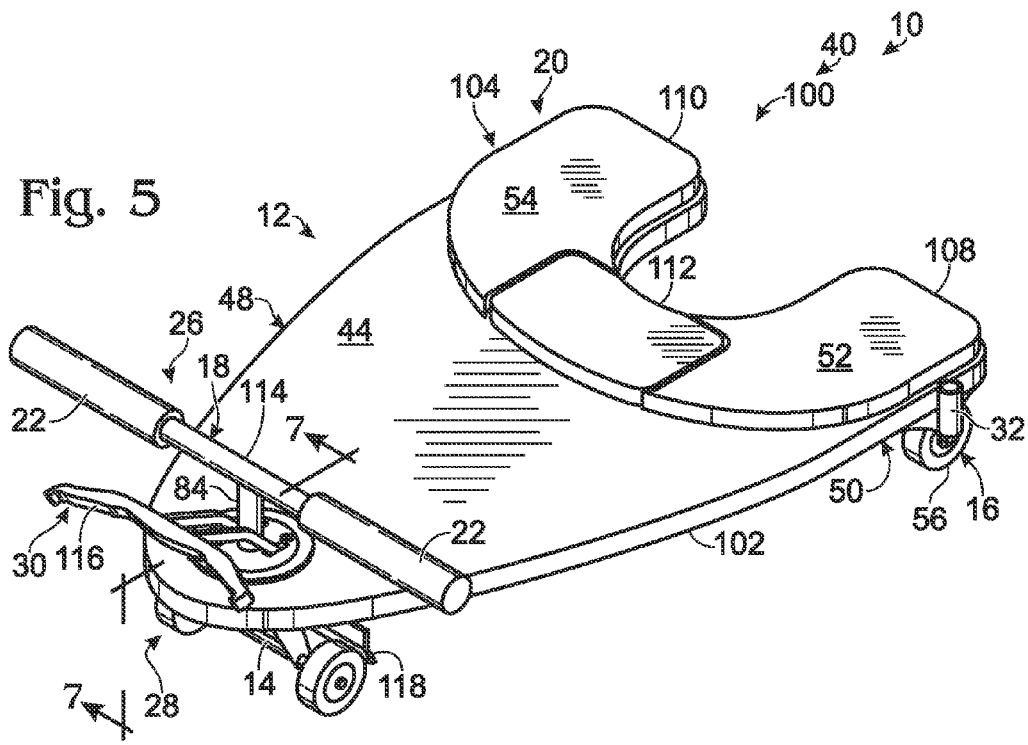
FIG. 5 is an isometric top view of an illustrative, non-exclusive example of a children's knee board according to the present disclosure.

Knee boards according to the present disclosure are schematically illustrated in FIG. 1 and are generally indicated at 10. Knee boards 10 are designed to be ridden by a rider in a kneeling position and to enable the rider to kick, or pump, the ground adjacent to the knee board to propel the knee board and the rider along the ground while remaining in a kneeling position. Knee boards 10 according to the present disclosure often will be sized and shaped for use by a child rider, in which case they may be referred to as children's knee boards, but it is within the scope of the present disclosure that knee boards 10 may be sized and shaped for use by adults or other older and/or larger riders. Knee boards 10 may be designed primarily for recreational and/or sporting use by children or other riders, and thus additionally or alternatively may be referred to as recreational and/or sporting knee boards. The rider of a knee board may additionally or alternatively be referred to herein as a user of the knee board.

As schematically illustrated in FIG. 1, knee boards 10 according to the present disclosure include at least a body 12 sized and shaped to receive a user in a kneeling position, a front wheel assembly 14 coupled to the body, a rear wheel assembly 16 coupled to the body, and a gripping member 18 coupled to the body. The front and rear wheel assemblies each include at least one wheel. Body 12 includes and/or defines at least a knee support region 20 configured to support the knees of a user on the top side of the body in a kneeling position, and gripping member 18 includes gripping regions 22 positioned for a user to grasp the gripping regions with the user's hands when at least one of the user's knees is supported by knee support region 20.

Body 12 defines an open kick region 24, which is laterally adjacent to at least a portion of knee support region 20. The open kick region is an open region through which a user kneeling on the knee board can extend his/her foot to kick, or pump, the ground and thereby propel himself/herself on the knee board. By laterally adjacent, it is meant that the open kick region extends at least partially to the right or to the left of at least a portion of the knee support region, with left and right being defined by the forward rolling direction of the knee board, as discussed herein. This may provide for a longer, and thus more forceful, propulsion stroke than if the user's foot could only contact the ground surface rearward of the knee board's body. Although not required to all embodiments, it is within the scope of the present disclosure that the open kick region of a knee board 10 may further extend forward of knee support region 20. In such embodiments, a user may be able to initiate the kick, or pump, stroke to propel the knee board by extending the user's foot through the open kick region to contact the ground surface from a position in which the user's foot is laterally next to the knee of the user's other leg (which is supported on knee support region 20), or even forward of the user's supported knee.

In FIG. 1, the open kick region is illustrated as overlapping body 12 to schematically indicate that the body itself at least partially defines the open kick region, and also that the open kick region may (although is not required to) extend beyond the body of the knee board. The open kick region may additionally or alternatively be described as a region, area, or volume of space adjacent to the body of the knee board and that is positioned to permit a user to extend a foot of one of the user's legs through the open kick region to contact the ground surface while maintaining the knee of the other of the user's legs on the knee support region. That is, a user may extend his/her foot through the open kick region to propel himself/herself on the knee board by kicking, or pumping, the ground. Kicking and/or pumping the ground refers to the leg and foot motion of the user contacting the ground with his/her foot and pushing back with the foot along the ground so that the knee board will be propelled forward and roll on the ground surface, akin to a user propelling him/herself on a skateboard; however, on a knee board according to the present disclosure, the kicking and/or pumping is performed in a kneeling position while one of the user's knees is supported on knee support region 20, as opposed to in a standing position as on a skateboard.

In FIG. 1, knee support region 20 is schematically illustrated in solid lines as extending on more than one side of open kick region 24, thereby schematically indicating that in some embodiments (although not required), the open kick region may be defined at least partially by the knee support region. Additionally or alternatively, as illustrated in dashed lines in FIG. 1, the knee support region may extend on opposite sides of the open kick region. Additionally or alternatively, in some embodiments, the open kick region may be described as extending between portions of the knee support region. It is also within the scope of the present disclosure that the knee support region extends between portions of the open kick region. In some embodiments, body 12 may include a contoured upper surface that is shaped to receive a user's knees, with the contoured upper surface defining the knee support region. Other configurations are also within the scope of the present disclosure, including configurations in which the knee support region is constructed of a resilient material that is configured to cushion the user's knees.

Bodies 12 according to the present disclosure may take a variety of suitable configurations and forms and may be constructed from a variety of suitable materials. For example, a body may be unitary in construction, such as may be formed of molded plastic, molded metal, or shaped wood. Additionally or alternatively, a body may include an assembly of structural components, one or more of which may define, or include, knee support region(s) 20. Stated differently, body 12 may (but is not required to) include a frame assembly that includes a plurality of interconnected frame members, one or more of which may define, or include, knee support region(s) 20 and/or which at least partially define an open kick region. In some embodiments, a frame assembly may include tubular frame members, such as tubular metal frame members. In some embodiments, at least one frame member, or the entirety of a body, may be molded from plastic or other material. In some embodiments, a frame assembly may include a generally planar member, such as a rigid planar member. In some such embodiments, the knee support region may be constructed of, or defined by, one or more pieces of a resilient material that are coupled to the planar member or to another frame member and which cushion a user's knees when kneeling on the knee support region. Other configurations are also within the scope of the present disclosure. Illustrative, non-exclusive examples of materials that may be suitable for construction of body 12, or portions thereof, including optional frame members thereof, include (but are not limited to) plastic, metal, and wood.

As mentioned, front wheel assemblies 14 and rear wheel assemblies 16 according to the present disclosure each include at least one wheel, with the wheel assemblies and/or the respective wheels rotatable about a respective rotating axis. A respective wheel assembly may include one wheel, two wheels, or more than two wheels.

The wheels may be coupled to the body of the knee board, and it is within the scope of the present disclosure that the wheels may be positioned at least partially beneath the bottom side of the body of the knee board. It is within the scope of the present disclosure, although not required to all embodiments, that at least one of the wheels, some of the wheels (such as the wheels of the rear wheel assemblies), or even all of the wheels may extend completely beneath the bottom side of the body. It is also within the scope of the present disclosure, although not required, that the wheels of the rear wheel assemblies may be sized and/or positioned so as not to extend into the kick region of the knee board.

In some embodiments, a wheel assembly may include a two-wheeled truck, such as is commonly used on skateboards, and that includes a rotating axis and a pivot axis that is transverse to the rotating axis but parallel to the longitudinal axis of the body of the knee board. Additionally or alternatively, a wheel assembly of a knee board 10 may include one or more wheels that rotate about a rotating axis but that do not pivot relative to the body of the knee board. Such wheels may be described as fixed wheels. Additionally or alternatively, a wheel assembly of a knee board 10 may include one or more casters. A caster, as used herein, is a wheel or wheel assembly that includes a rotating axis about which the wheel(s) rotate(s) and a pivot axis that is generally transverse both to the rotating axis and to the body of the knee board, or longitudinal axis thereof. That is, a caster includes a wheel that rotates about its rotating axis, and the caster itself, or at least a portion thereof including the wheel, rotates, pivots, and/or spins about a pivot axis that is transverse to the rotating axis. When a caster wheel is utilized, the pivot axis of the wheel may extend perpendicular to the body of the knee board, such as extending in a vertical direction, but it is also within the scope of the present disclosure that the pivot axis may extend in an inclined or other non-vertical direction.

Gripping member 18 of knee boards 10 may take any suitable form or configuration suitable for a user to grasp with the user's hands while kneeling on the body of the knee board. Illustrative, non-exclusive examples of gripping members include (but are not limited to) handlebars, or handlebar assemblies, and wheels, or wheel assemblies, such as steering wheels in embodiments that include a mechanism for steering the knee board, as discussed herein. Other forms and configurations are also within the scope of the present disclosure.

As schematically illustrated in dashed lines in FIG. 1, knee boards 10 according to the present disclosure may (but are not required to) further include a steering assembly 26. The steering assembly, when present, includes gripping member 18, and in some embodiments may be described as being operatively coupled to front wheel assembly 14. Additionally or alternatively, the steering assembly may be described as including the front wheel assembly, as indicated in dash-dot lines in FIG. 1. In embodiments of knee boards 10 that include a steering assembly, the gripping member is operatively coupled to the front wheel assembly, the front wheel assembly is pivotally coupled to body 12, and thus the steering assembly is configured to pivot the front wheel assembly about a pivot axis in response to user-imparted forces on gripping member 18. In other words, the steering assembly enables a user to steer the knee board by turning the gripping member while the knee board is rolling along a ground surface. The steering assembly, when present, may be described as having a straight configuration, in which the rotating axis of the front wheel assembly is perpendicular to the longitudinal axis of the body, and a range of turning configurations, in which the rotating axis is not perpendicular to the longitudinal axis of the body. The steering assembly, when present, may be configured to pivot the front wheel assembly any suitable amount. Illustrative, non-exclusive examples of ranges of pivoting, or turning, include up to 360, 270, 180, 120, and 90 degrees, for example, having a range of up to 180, 135, 90, 60, and 45 degrees, respectively, on either side of the straight configuration. Other configurations are also within the scope of the present disclosure.

As also schematically illustrated in dashed lines in FIG. 1, knee boards 10 according to the present disclosure may (but are not required to) further include a braking assembly 28 operatively coupled to a suitable portion or portions of the knee board, such as to body 12, front wheel assembly 14, rear wheel assembly 16, and/or steering assembly 26. The braking assembly, when present, includes an actuator 30 that is positioned to be selectively engaged by a user while in a kneeling position on the knee board. The braking assembly, when present, is configured to restrict rotation of a wheel of one or both of front wheel assembly 14 and rear wheel assembly 16 in response to a user engaging the actuator. This is schematically illustrated in FIG. 1 by the dashed connections between braking assembly 28 and the front and rear wheel assemblies.

In some embodiments, the actuator may be positioned relative to gripping regions 22 of gripping member 18 in such a position as to enable engaging of the actuator while maintaining a grasp of the gripping regions. This is schematically illustrated in FIG. 1 by the dashed connection between braking assembly 28 and gripping member 18.

As also schematically illustrated in dashed lines in FIG. 1, knee boards 10 according to the present disclosure may (but are not required to) further include a signaling device 32 operatively coupled to body 12 and configured to increase the visibility of a user riding a knee board. A flag extending on a pole is an illustrative, non-exclusive example of an optional signaling device. In some embodiments, as schematically illustrated in FIG. 1, the signaling device may be coupled to rear wheel assembly 16. Other configurations and locations of the optional signaling device are also within the scope of the present disclosure.

Illustrative, non-exclusive examples of knee boards 10 according to the present disclosure are schematically illustrated in FIG. 2 and are indicated generally at 40. Body 12 of knee boards 10, including knee boards 40 according to the present disclosure, have a longitudinal axis 42 and include a top side 44 and a bottom side 46, and a forward region 48 and a rear region 50 extending along the longitudinal axis. Accordingly, as used herein, such directional terms as forward, front, rear, rearward, backward, back, left, right, etc. are defined in terms of an intended forward direction of rolling for knee boards 10 that is parallel to longitudinal axis 42. That is, in use, a user generally faces forward on the knee board, but it is within the scope of the present disclosure that knee boards 10 also may roll, or travel in, at least a backward direction.

FIG. 2 schematically illustrates knee boards 40 from a top plan view perspective. Accordingly, gripping member 18 is illustrated in solid lines, as it is positioned on the top side of the body, and front wheel assembly 14 and rear wheel assemblies 16 are illustrated in hidden lines, as they are positioned on the bottom side of the body. Furthermore, front wheel assembly 14 is positioned on the bottom side of forward region 48 of body 12, and rear wheel assemblies 16 are positioned on the bottom side of rear region 50 of body 12.

Knee support region 20 of knee boards 40 according to the present disclosure includes a left knee support region 52 and a right knee support region 54 that is laterally spaced away from the left support region. As such, body 12 of knee boards 40 define an open kick region 24 in which at least a portion of the open kick region is defined between left knee support region 52 and right knee support region 54 along longitudinal axis 42.

Knee boards 40 according to the present disclosure include a left rear wheel assembly 56 coupled to the body, such as beneath left knee support region 52, and a right rear wheel assembly 58 coupled to the body, such as beneath right knee support region 54. As illustrated, the left and right rear wheel assemblies are shown coupled to the bottom side of the body, but this is not required to all embodiments. In some embodiments of knee boards 40 according to the present disclosure, at least a portion of open kick region 24 may extend between the left and right wheel assemblies. Additionally or alternatively, in some embodiments the open kick region may extend forward of the left and right wheel assemblies. The left and right rear wheel assemblies may be positioned entirely beneath the respective left and right knee support regions, but it is within the scope of the present disclosure that a portion or even all of one or more of the left and right rear wheel assemblies may extend beyond the respective knee support regions.

In some embodiments of knee boards 40, body 12 may be described as at least partially defining secondary kick regions that are positioned to the left and right of the left and right knee support regions, respectively. That is, open kick region 24 may be described as including a primary, or central, kick region 60 that extends between the left and right knee support members, a left secondary kick region 62 at least partially defined to the left of and laterally adjacent to the left knee support region, and a right secondary kick region 64 at least partially defined to the right of and laterally adjacent to the right knee support region, as schematically illustrated in FIG. 2. In some such embodiments, the open kick region 24 may be noncontinuous in that the primary and secondary kick regions are spaced apart and do not interconnect. Additionally or alternatively, however, the open kick region 24 may extend behind, or to the rear of, body 12, and thus link the primary and secondary kick regions to form a single continuous open kick region 24. To some extent, whether the open kick region is continuous or not in knee boards 40 according to the present disclosure, is determined by the individual riding style of a user of knee board 40 and by where the user extends his/her foot for kicking, dragging, placing, pushing off with, etc. for various riding styles, positions, maneuvers, tricks, ground surface conditions, etc.

Body 12 of knee boards 40 according to the present disclosure may take a variety of shapes and forms. For example, as illustrated in solid lines in FIG. 2, rear region 50 of body 12 may be described as being generally U-shaped, or in some embodiments V-shaped, or C-shaped, in that the left and right knee support regions extend along opposing sides of a central open kick region, which is open to the rear of the body. In some such embodiments, the open kick region may be described as extending beyond the rear of the body. Accordingly, in such embodiments the body may be described as defining only a portion of the open kick region, in so far as the open kick region extends beyond the body.

Additionally or alternatively, in some embodiments of knee boards 40 according to the present disclosure, body 12 may fully encircle a central open kick region, in that the body may extend fully around the open kick region, including to the rear of the central open kick region, as schematically illustrated in dash-dot lines in FIG. 2. Such embodiments may be particularly well suited for a knee board 10 that may be configured both for the user to kneel on and for the user to lie down on. Other configurations are also within the scope of the present disclosure.

The left and right knee support regions of knee boards 40 are schematically illustrated in dashed lines in FIG. 2, schematically indicating that knee support region(s) 20 according to the present disclosure may simply be an area, and not necessarily a separate component, on the top side of body 12. For example, as mentioned, body 12 may be unitary in construction or at least may include a unitary frame that defines both forward region 48 and rear region 50, and in some embodiments with the rear region including and/or defining at least a portion of knee support region(s) 20. Additionally or alternatively, and as mentioned, however, body 12 may include an assembly of structural components, one or more of which may define, or include, knee support region(s) 20.

FIG. 2 also schematically illustrates optional braking assembly 28. In FIG. 2, the optional braking assembly is schematically illustrated as overlapping gripping member 18, schematically illustrating that actuator 30 of the optional braking assembly may be positioned relative to the gripping member in such a position as to be selectively engaged by a user. That is, the actuator may be positioned relative to gripping regions 22 in a position for a user to grasp the actuator with at least one of the user's hands. For example, in some embodiments, as discussed herein, the actuator may be positioned generally forward of the gripping member to enable a user to grasp the actuator with his/her finger(s) while maintaining a grasp of the gripping member. As also discussed herein, in some embodiments, the actuator may be positioned generally rearward of the gripping member to enable a user to grasp the actuator with his/her thumb(s), while maintaining a grasp of the gripping member. Other configurations are also within the scope of the present disclosure, including configurations in which an actuator is positioned for actuation by a user's hand spaced away from the gripping member, or by a user's foot, knee, elbow, etc.

Optional braking assembly 28 is also schematically illustrated as overlapping front wheel assembly 14, schematically illustrating that the braking assembly, or at least a portion thereof, may be positioned relative to the front wheel assembly in a variety of configurations such that the braking assembly is configured to restrict rotation of one or more wheels of a front wheel assembly responsive to actuation of the actuator by a user. For example, as discussed herein, the braking assembly may engage a wheel generally from the front side thereof in some embodiments, while in other embodiments the braking assembly may engage a wheel generally from the rear side thereof. Other configurations are also within the scope of the present disclosure.

The optional braking assembly is also schematically illustrated as being connected to the left and right rear wheel assemblies of knee board 40. That is, in some embodiments (although not required) a knee board 10 may include a braking assembly that is additionally or alternatively configured to restrict rotation of one or more wheels of a rear wheel assembly.

Additional illustrative, non-exclusive examples of knee boards 10 according to the present disclosure are schematically illustrated in FIG. 3 from a top plan view perspective and are indicated generally at 70. Where appropriate, the reference numerals from the illustrative, non-exclusive examples of knee boards 40 of FIG. 2 are used to designate corresponding parts of knee boards 70. For example, knee boards 70, like knee boards 40 of FIG. 2, include body 12, front wheel assembly 14, rear wheel assembly 16, and gripping member 18. Furthermore, knee boards 70 may (but are not required to) include optional steering assembly 26 and optional braking assembly 28.

Knee boards 70 according to the present disclosure include a knee support region 20 that extends along the longitudinal axis of the body and that is narrower than at least a portion of forward region 48 of body 12. As such, the body of knee boards 70 defines a left kick region 72 and a right kick region 74, with the knee support region 20 positioned, or extending, between the left kick region and the right kick region along longitudinal axis 42. That is, open kick region 24 of knee boards 70 include left kick region 72 and right kick region 74. In some embodiments, open kick region 24, including the left and right kick regions, of knee boards 70 may extend forward of the rear wheel assembly. In some embodiments, open kick region 24 of knee boards 70 may be described as extending rearward of the knee support region, as illustrated in dash-dot lines in FIG. 3. To some extent, whether the open kick region is continuous or not and/or whether the open kick region extends directly behind the knee support region of knee boards 70 according to the present disclosure, is determined by the individual riding style of a user of knee board 70 and by where the user extends his/her foot for kicking, dragging, placing, pushing off with, etc. for various riding styles, positions, maneuvers, tricks, ground surface conditions, etc.

Knee boards 70 according to the present disclosure, in addition to front wheel assembly 14 and rear wheel assembly 16, also may (but are not required to) include one or more intermediate wheel assemblies 76 positioned on bottom side 46 of forward region 48 of body 12 and rearward of the front wheel assembly. The examples of FIG. 3 are schematically illustrated with two intermediate wheel assemblies 76, but it is within the scope of the present disclosure that a knee board 70 includes only a single intermediate wheel assembly or more than two intermediate wheel assemblies. An intermediate wheel assembly includes at least one wheel and in some embodiments may include a caster, as defined herein.

With reference to the schematic illustrations of knee boards 10 in FIGS. 2-3, open kick regions 24 may be described in terms of an extent of being bound, or defined, by body 12 of the respective knee board. For example, considering the schematic solid outline of body 12 of knee boards 40 in FIG. 2, the central kick region 60 may be described as being perimetrically bound by approximately 180 degrees because the left knee support region 52 and the right knee support region 54 extend on opposing sides of the central kick region and define generally parallel borders, or edges, of the central kick region. Now considering the schematic solid outline of body 12 of knee boards 70 in FIG. 3, left kick region 72 and right kick region 74 may be described as being perimetrically bound by approximately 90 degrees because forward region 48 and rear region 50 form a right angle to define the left and right kick regions.

FIG. 3 schematically illustrates two additional degrees of a kick region being perimetrically bound. For example, as illustrated in dash-dot lines at 78, a body of a knee board may perimetrically bind an open kick region by approximately 45 degrees. Also, as illustrated in dash-dot lines at 80, a body of a knee board may perimetrically bind an open kick region by approximately 60 degrees. The illustrations of FIGS. 2-3, being schematic illustrations, are intended to illustrate various degrees of an open kick region being perimetrically bound, and any suitable degree of being perimetrically bound is within the scope of the present disclosure. For example, illustrative, non-exclusive examples of an open kick region may be perimetrically bound by the body by approximately 45, 60, 90, 120, 180, 270, or 360 degrees, by 0-45, 0-60, 0-90, 0-120, 0-180, 0-270, 0-360, 45-180, 90-120, or 90-180 degrees, by at least 45, 60, 90, 120, 180, or 270 degrees. Any suitable degrees of an open kick region being bound by a body of a knee board are within the scope of the present disclosure and are not limited to the enumerated degrees herein.

Turning now to FIG. 4, a schematic side elevation view of illustrative, non-exclusive examples of knee boards 10, which may include knee boards 40 and knee boards 70 according to the present disclosure, is provided.

As discussed, knee support region(s) 20 of knee boards 10 according to the present disclosure may simply be an area, and not necessarily a separate component, on top side 44 of body 12. Additionally or alternatively, however, body 12 may include an assembly of structural components, one or more of which may define, or include, knee support region(s) 20, as schematically represented by a dashed knee support region 20 in FIG. 4.

FIG. 4 also schematically illustrates optional steering assembly 26 with the front wheel assembly pivotally coupled to body 12 about a pivot axis 82. In some embodiments, steering assembly 26 may include a steering column 84 that extends through body 12 from gripping member 18 to front wheel assembly 14 and operatively connecting the gripping member to the front wheel assembly. In some such embodiments, the steering column may be coaxial with the pivot axis of the front wheel assembly.

Additionally or alternatively, as illustrated in dashed lines in FIG. 4, the front wheel assembly, a wheel thereof, and/or the rotating axis thereof may be offset from the pivot axis of the front wheel assembly. In the optional placement illustrated in FIG. 4, the wheel(s) are offset rearward of the pivot axis of the front wheel assembly. Stated differently, the rotating axis of the front wheel assembly is offset from and does not intersect the pivot axis of the front wheel assembly, and in the illustrated optional position, the pivot axis is forward of the rotating axis of the front wheel assembly, at least when the front wheel assembly is in the straight configuration, as illustrated in FIG. 4.

Additionally or alternatively, as also illustrated in dashed lines in FIG. 4, the steering column may not extend through the body of the knee board and may be offset from the pivot axis of the front wheel assembly. For example, the steering column may extend in front of the body of the knee board as schematically illustrated in FIG. 4. In some such embodiments, gripping regions 22 of the gripping member may be forward of the rotating axis of the front wheel assembly, at least when the front wheel assembly is in the straight configuration, as illustrated in FIG. 4.

FIG. 4 also illustrates optional braking assembly 28, and schematically illustrates two illustrative, non-exclusive positions of actuator 30 of the braking assembly. As illustrated, in some embodiments, the actuator may be positioned generally forward of gripping regions 22, for example, as to permit a user to grasp the actuator with his/her finger(s) while maintaining a grasp of the gripping regions. Additionally or alternatively, as also illustrated, in some embodiments, the actuator may be positioned generally rearward of the gripping regions, for example, as to permit a user to grasp the actuator with his/her thumb(s) while maintaining a grasp of the gripping regions. Other configurations are also within the scope of the present disclosure.

Also, as mentioned, braking assembly 28, or at least a portion thereof, may be positioned relative to the front wheel assembly in a variety of configuration such that the braking assembly is configured to restrict rotation of one or more wheels of a front wheel assembly responsive to actuation of the actuator by a user. For example, in FIG. 4, braking assembly 28 is schematically illustrated relative to both illustrated and optional positions of front wheel assembly 14. More specifically, a portion of the braking assembly is schematically illustrated forward of the front wheel assembly that is illustrated in solid lines, and is schematically illustrated rearward of the front wheel assembly that is illustrated in dashed lines, schematically representing that any suitable location and configuration of a braking assembly, or portion thereof, is within the scope of the present disclosure.

FIG. 4 also schematically illustrates illustrative, non-exclusive examples of signaling devices 32 according to the present disclosure, in the form of a flag extending on a pole coupled to one or more of body 12, rear wheel assembly 16, and optional intermediate wheel assembly 76. Other locations and configurations of signaling devices are also within the scope of the present disclosure.

Turning now to FIGS. 5-14, illustrative, non-exclusive examples of knee boards 10 according to the present disclosure, and portions thereof, are illustrated, Where appropriate, the reference numerals from the schematic illustrations of FIGS. 1-4 are used to designate corresponding parts of knee boards 10 according to the present disclosure; however, the examples of FIGS. 5-14 are non-exclusive and do not limit the present disclosure to the illustrated embodiments. That is, neither knee boards nor various portions thereof are limited to the specific embodiments disclosed and illustrated in FIGS. 5-14, and knee boards according to the present disclosure may incorporate any number of the various aspects, configurations, characteristics, properties, etc. illustrated in the embodiments of FIGS. 5-14, in the schematic representations of FIGS. 1-4, as well as variations thereof, without requiring the inclusion of all such aspects, configurations, characteristics, properties, etc. For the purpose of brevity, each previously discussed component, part, portion, aspect, region, etc., or variants thereof, may not be discussed again with respect to FIGS. 5-14; however, it is within the scope of the present disclosure that the previously discussed features, materials, variants, etc. may be utilized with the illustrated embodiments of FIGS. 5-14.

Figure 6:
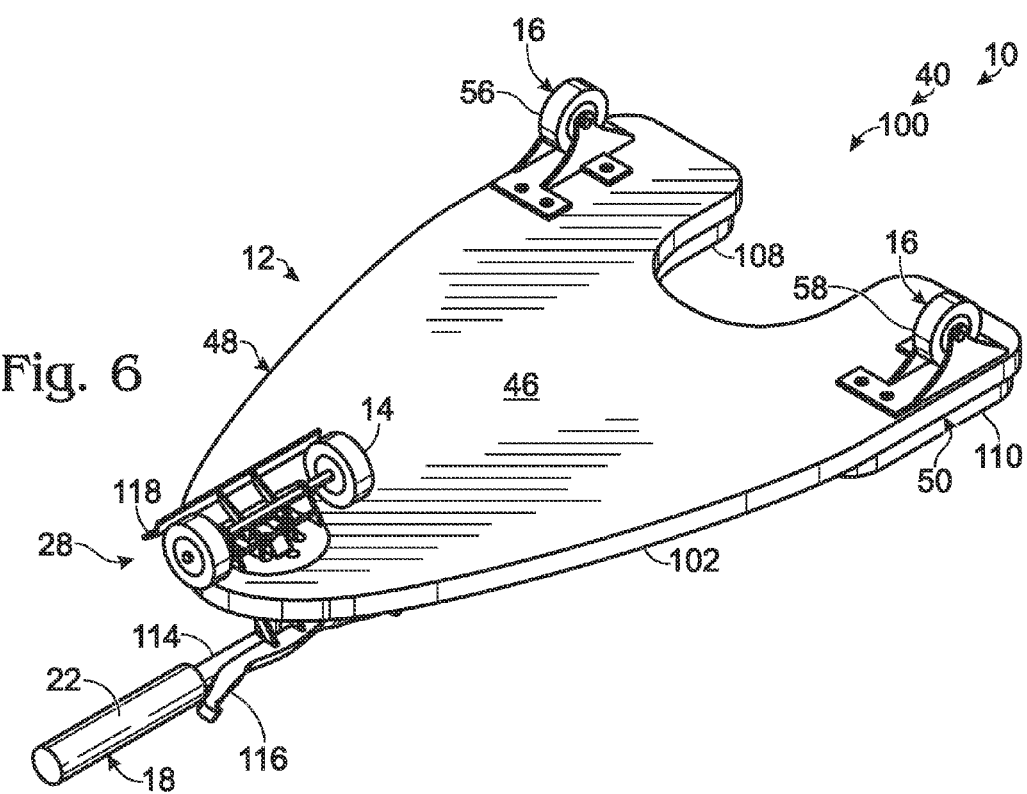
FIG. 6 is an isometric bottom view of the children's knee board of FIG. 5.

An illustrative, non-exclusive example of a knee board 10 according to the present disclosure is illustrated in FIGS. 5-6 and is generally indicated at 100, Knee board 100 is an example of a knee board 40 according to the present disclosure, such as schematically illustrated in FIG. 2 and discussed herein. Knee board 100 is illustrated in the straight configuration in FIG. 5 and in a turning configuration in FIG. 6.

Knee board 100 includes a body 12 that includes a generally rigid planar member 102 and a series of resilient foam members 104 that are coupled to the top surface of the planar rigid member and that define knee support region 20, including left knee support region 52 and right knee support region 54. That is, a left foam member 108 defines left knee support region 52, and a right foam member 110 defines right knee support region 54. An optional third, center, foam member 112 is positioned between the left and right foam members, and together with the left and right foam members, defines a generally C- or U-shaped knee support region. It is within the scope of the present disclosure that a single resilient foam member and/or other suitable knee support may be used.

Body 12 of knee board 100 may be described as having a generally rounded triangular shape with a generally U-shaped recess extending into rear region 50 of the body and that defines at least a portion of an open kick region. Additionally or alternatively, body 12 may be described as including a generally rounded triangular shaped forward region 48 and a U- or C-shaped rear region 50 that defines an open kick region.

Knee board 100 includes a left rear wheel assembly 56 and a right rear wheel assembly 58, each of which include a single fixed wheel that does not pivot with respect to the body of the knee board.

Knee board 100 includes optional steering assembly 26, which, as illustrated, includes a gripping member 18 in the form of a handlebar 114 and a steering column 84 interconnecting the handlebar with front wheel assembly 14. The steering assembly of knee board 100 is configured to permit 180 degrees of turning of the front wheel assembly. That is, the steering assembly is configured to permit 90 degrees of turning on either side of the straight configuration, and in FIG. 6 is illustrated in a full 90 degree turn. Any suitable stop, or detent, mechanism may be utilized to band, or limit, the range of rotation of the steering assembly.

Knee board 100 also includes optional braking assembly 28. The example of the braking assembly embodied in knee board 100 includes an actuator 30 in the form of a lever arm 116 that is partially positioned generally forward of the handlebar and that enables a user to grasp the lever arm with his/her fingers while maintaining a grasp of the handlebar itself, similar to the hand brake levers of a typical bicycle. The actuator is operatively linked to a friction member 118 that is positioned generally rearward of the wheels of the front wheel assembly, and which engage and restrict rotation of the wheels when a user pulls on the lever arm.

FIG. 7 illustrates in detail the steering assembly and the braking assembly of knee board 100; however, the illustrated steering assembly and braking assembly may be used with any embodiment of a knee board 10 according to the present disclosure.

The illustrated steering assembly of FIG. 7 includes a collar member 120 that extends through a circular hole 122 of the rigid planar member 102 of the knee board's body 12. The collar member is configured to rotate within the circular hole and is operatively coupled to steering column 84 and a wheel support bracket 124 that defines the rotating axis of front wheel assembly 14. Accordingly, when a user turns handlebar 114 of the steering assembly, the wheel support bracket also turns, thereby turning the front wheel assembly.

The illustrated braking assembly of FIG. 7 includes lever arm 116, which includes a finger member 126 positioned generally forward of handlebar 114, and thereby in a position for a user to grasp the finger member with his/her finger(s) while maintaining a grasp of the handlebar. Lever arm 116 extends through hole, or aperture, 122 and is pivotally coupled to wheel support bracket 124. Friction member 118 is coupled to the lever arm in a position generally above the wheels of the front wheel assembly, and a torsion spring 128 biases the friction member away from the wheels. Accordingly, to apply the brake, a user grasps finger member 126 and pulls, or squeezes, it toward the handlebar and against the bias of the torsion spring, thereby pivoting the lever arm and bringing the friction member into contact with the front wheels. When the user releases his/her squeeze on the finger member, the friction member will pivot away from the wheels. This pivoting motion of the friction member is indicated by a double-headed arrow in FIG. 7.

FIG. 8 illustrates in detail an alternative embodiment of an optional braking assembly 28 for knee boards 10 according to the present disclosure. The steering assembly illustrated in FIG. 8 is the same as that of FIG. 7, and thus of knee board 100; however, the illustrated braking assembly of FIG. 8 may be used with any embodiment of knee boards 10 according to the present disclosure.

The illustrated braking assembly of FIG. 8 includes a lever arm 116, which includes a thumb member 130 positioned generally rearward of handlebar 114, and thereby in a position for a user to grasp the thumb member with his/her thumb (s) while maintaining a grasp of the handlebar. The lever arm extends through hole 122 and is pivotally coupled to wheel support bracket 124. A friction member 118 is coupled to the lever arm in a position generally forward of the wheels of the front wheel assembly, and a torsion spring 128 biases the friction member away from the wheels. Accordingly, to apply the brake, a user grasps thumb member 130 and pulls, or squeezes, it toward the handlebar and against the bias of the torsion spring, thereby pivoting the lever arm and bringing the friction member into contact with the front wheels. When the user releases his/her squeeze on the thumb member, the friction member will pivot away from the wheels. This pivoting motion of the friction member is indicated by a double-headed arrow in FIG. 8.

Another illustrative, non-exclusive example of a knee board 10 according to the present disclosure is illustrated in FIG. 9 and is generally indicated at 200. Knee board 200 is an example of a knee board 40 according to the present disclosure, and which includes an optional steering assembly 26, such as schematically illustrated in FIG. 2 and discussed herein. Knee board 200 may be described as including a body 12 that includes a unitary frame 202 that defines both the forward region 48 and the rear region 50 of the body. Unitary frame 202 includes a contoured upper surface 204 that defines a U-shaped knee support region 20. The unitary frame may be constructed of molded plastic; however, other materials and manufacturing methods are also within the scope of the present disclosure, including non-unitary members that define the knee support region and/or a knee support region that is defined by and/or includes a resilient material to cushion the knees of a user.

Another illustrative, non-exclusive example of a knee board 40 according to the present disclosure is illustrated in FIG. 10 and is generally indicated at 300. Knee board 300 includes both an optional steering assembly 26 and a braking assembly 28. Knee board 300 may be described as including a body 12 that includes a plurality of interconnected frame members, including a unitary frame member 302 that defines rear region 50, and a tubular frame member 304 defining forward region 48 that interconnects unitary frame member 302 and the steering assembly. Unitary frame member 302 includes a contoured upper surface 204 that defines a U-shaped knee support region 20. The unitary frame member may be constructed of molded plastic; however, other materials and manufacturing methods are also within the scope of the present disclosure, including non-unitary members that define the knee support region and/or a knee support region that is defined by and/or includes a resilient material to cushion the knees of a user.

Figure 11:
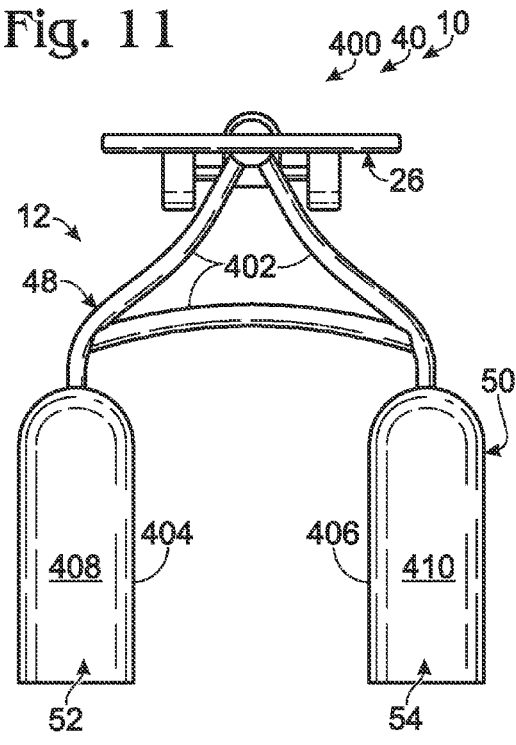
FIG. 11 is a top plan view of another illustrative, non-exclusive example of a children's knee board according to the present disclosure.

Another illustrative, non-exclusive example of a knee board 40 according to the present disclosure is illustrated in FIG. 11 and is generally indicated at 400. Knee board 400 includes an optional steering assembly 26. Knee board 400 may be described as including a body 12 that includes a plurality of interconnected frame members, including a plurality of tubular frame members 402 that define forward region 48, and a left knee support member 404 and a right knee support member 406 that collectively define rear region 50. The left and right unitary knee support members respectively include a left contoured upper surface 408 that defines left knee support region 52 and a right contoured upper surface 410 that defines right knee support region 54. The unitary knee support members may be constructed of molded plastic; however, other materials and manufacturing methods are also within the scope of the present disclosure, including non-unitary knee support members that define the left and right knee support regions and/or left and right knee support regions that are defined by or include a resilient material to cushion the knees of a user.

Figure 12:
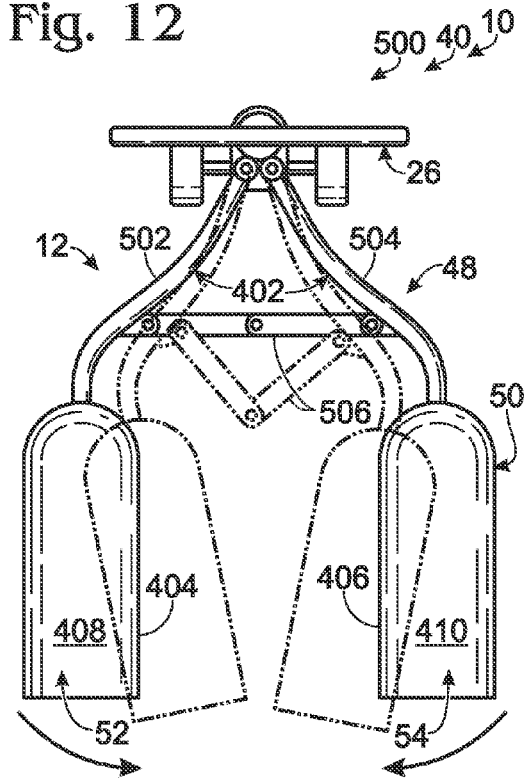
FIG. 12 is a top plan view of another illustrative, non-exclusive example of a children's knee board according to the present disclosure.

Another illustrative, non-exclusive example of a knee board 40 according to the present disclosure is illustrated in FIG. 12 and is generally indicated at 500. Knee board 500 includes an optional steering assembly 26. Knee board 500 is similar to knee board 400 of FIG. 11, in that it includes a plurality of interconnected frame members, including a plurality of tubular frame members 402, a left knee support member 404, and a right knee support member 406. However, knee board 500 is configured to be selectively (and reversibly) collapsed into a folded configuration, such as illustrated in dash-dot-dot lines in FIG. 12. Forward region 48 of knee board 500 includes a left tubular frame member 502 and a right tubular frame member 504, both of which are pivotally coupled to steering assembly 26. A lateral scissor member 506 interconnects is the left and right tubular frame members and, as illustrated, pivots about an axis when the knee board is configured into the folded configuration. Other configurations of foldable or collapsible knee boards are also within the scope of the present disclosure, and such knee boards are not limited to the embodiment illustrated in FIG. 12.

Figure 13:
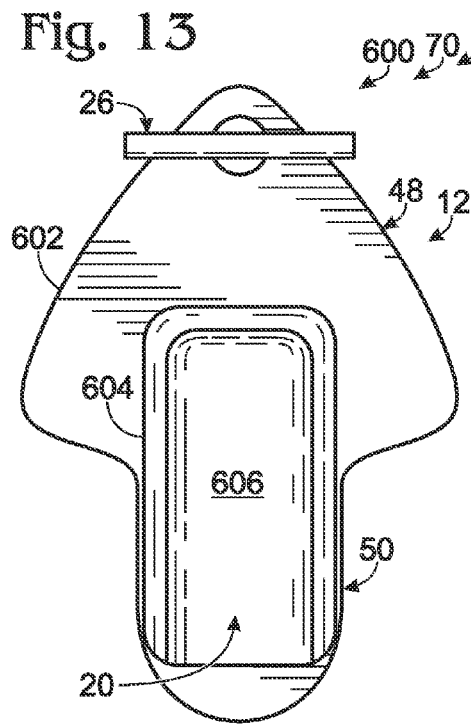
FIG. 13 is a top plan view of another illustrative, non-exclusive example of a children's knee board according to the present disclosure.
Figure 14:
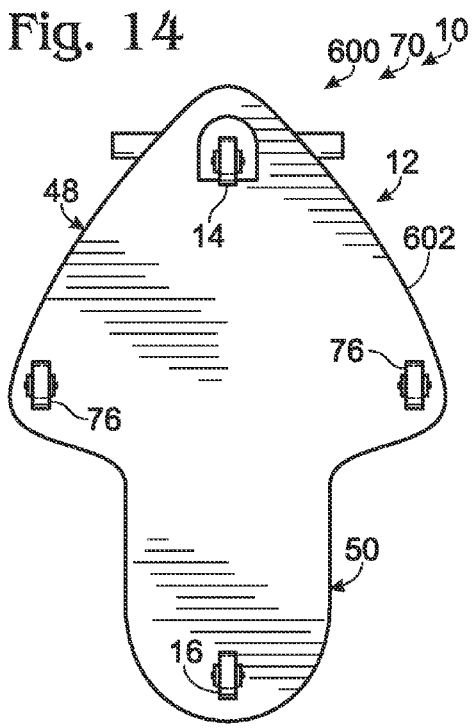
FIG. 14 is a bottom plan view of the children's knee board of FIG. 13.

Another illustrative, non-exclusive example of a knee board 70 according to the present disclosure, such as schematically illustrated in FIG. 3 and discussed herein, is illustrated in FIGS. 13-14 and is generally indicated at 600. Knee board 600 includes an optional steering assembly 26 and a body 12 that includes a planar rigid member 602 and a resilient knee support member 604 that is coupled to the top side of the planar rigid member and that defines knee support region 20. More specifically, knee support member 604 has a contoured upper surface 606 that defines the knee support region, and because it is constructed of a resilient material, provides cushioning to a user's knees when the user is kneeling on the knee board.

The body of knee board 600 may be described as having a generally rounded arrowhead shape, and as illustrated in FIG. 13, the knee support region may extend over both a portion of the forward region 48 and over the rear region 50 of the body. The forward region of knee board 600 may be described as having a generally rounded triangular shape, and the rear region of knee board 600 may be described as having a generally rounded rectangular shape.

As illustrated in FIG. 14, knee board 600 includes a front wheel assembly 14 with a single wheel, a rear wheel assembly 16 with a single wheel, and two intermediate wheel assemblies 76, each with a single wheel and positioned under forward region 48 of the body. The intermediate wheel assemblies each include a caster, and therefore the respective wheels may pivot relative to the body of the knee board so as to permit a user to smoothly turn the knee board with the steering assembly.

The following enumerated paragraphs represent illustrative, non-exclusive ways of describing inventions according to the present disclosure.

A A knee board for riding in a kneeling position on a ground surface, the knee board comprising:

a body sized and shaped to receive a user in a kneeling position, the body having a longitudinal axis and including a top side and an bottom side, and a forward region and a rear region extending along the longitudinal axis, wherein the rear region includes a knee support region configured to support the knees of the user on the top side of the body, and wherein the body defines an open kick region laterally adjacent to at least a portion of the knee support region, the open kick region sized and positioned to permit a user to extend a foot of one of the user's legs through the open kick region to contact the ground surface while maintaining the knee of the other of the user's legs on the knee support region;

a front wheel assembly coupled to the body, optionally positioned on the bottom side of the forward region of the body, and including at least one wheel configured to rotate about a rotating axis;

a rear wheel assembly coupled to the body, optionally positioned on the bottom side of the body, optionally beneath the knee support region, and including at least one wheel;

a gripping member coupled to the body and including gripping regions positioned for a user to grasp the gripping regions with the user's hands when at least one of the user's knees is supported by the knee support region.

A1 The knee board of paragraph A, wherein the knee support region includes a left knee support region and a right knee support region laterally spaced away from the left knee support region; and wherein at least a portion of the open kick region is defined between the left and right knee support regions along the longitudinal axis of the body.

A2 The knee board of paragraph A,
wherein the knee support region includes a left knee support region and a right knee support region laterally spaced away from the left knee support region; and
wherein the open kick region includes:
a primary kick region at least partially defined between the left and right knee support regions along the longitudinal axis of the body.

A2.1 The knee board of paragraph A2, wherein the open kick region further includes:
a left secondary kick region at least partially defined left of and laterally adjacent to the left knee support region; and
a right secondary kick region at least partially defined right of and laterally adjacent to the right knee support region.

A3 The knee board of any of paragraphs A1-A2.1, wherein the rear wheel assembly includes:
a left rear wheel assembly coupled to the body, optionally positioned on the bottom side of the body, and further optionally positioned beneath the left knee support region; and
a right rear wheel assembly coupled to the body, optionally positioned on the bottom side of the body, and further optionally positioned beneath the right knee support region.

A3.1 The knee board of paragraph A3, wherein at least a portion of the open kick region extends between the left and right rear wheel assemblies.

A3.2 The knee board of any of paragraphs A3-A3.1, wherein the open kick region extends forward of the left and right rear wheel assemblies.

A3.3 The knee board of any of paragraphs A3-A3.1, wherein the open kick region extends forward of the knee support region.

A3.4 The knee board of any of paragraphs A1-A3.3, wherein the body has a generally rounded triangular shape with a generally U-shaped recess extending into the rear region of the body and defining at least a portion of the open kick region.

A4 The knee board of paragraph A,
wherein the open kick region includes a left kick region and a right kick region; and
wherein the knee support region is positioned between the left kick region and the right kick region along the longitudinal axis.

A4.1 The knee board of paragraph A4, further comprising:
an intermediate wheel assembly coupled to the body, positioned on the bottom side of the forward region of the body rearward of the front wheel assembly, and including at least one wheel.

A4.1.1 The knee board of paragraph A4.1, wherein the at least one wheel of the intermediate wheel assembly includes a caster.

A4.2 The knee board of any of paragraphs A4-A4.1.1, wherein at least a portion of the open kick region extends forward of the rear wheel assembly.

A4.3 The knee board of any of paragraphs A4-A4.2, wherein the open kick region extends forward of the knee support region.

A4.4 The knee board of any of paragraphs A4-A4.3, wherein the body has a generally arrowhead shape, wherein the forward region is generally triangular and the rear region is generally rectangular.

A5 The knee board of any of paragraphs A-A4.3, further comprising:
a steering assembly operatively coupled to the front wheel assembly, wherein the steering assembly includes the gripping member;
wherein the front wheel assembly is pivotally coupled to the body;
wherein the steering assembly is configured to pivot the front wheel assembly about a pivot axis responsive to user-imparted forces on the gripping member; and
wherein the steering assembly includes a straight configuration, in which the rotating axis is perpendicular to the longitudinal axis of the body, and a range of turning configurations, in which the rotating axis is not perpendicular to the longitudinal axis of the body.

A5.1 The knee board of paragraph A5, wherein the rotating axis is offset from and does not intersect the pivot axis.

A5.2 The knee board of any of paragraphs A5-A5.1, wherein the pivot axis is forward of the rotating axis when the front wheel assembly is in the straight configuration.

A5.3 The knee board of any of paragraphs A5-A5.2, wherein the gripping regions of the gripping member are forward of the rotating axis when the front wheel assembly is in the straight configuration.

A5.4 The knee board of any of paragraphs A5-A5.3, wherein the steering assembly includes a steering column that extends through the body from the gripping member to the front wheel assembly.

A6 The knee board of any of paragraphs A-A5.4, further comprising:
a brake assembly operatively coupled to at least one of the body, the front wheel assembly, the rear wheel assembly, and the steering assembly of the knee board, wherein the brake assembly includes an actuator positioned to be selectively engaged by a user, wherein the brake assembly is configured to restrict rotation of the respective at least one wheel of at least one of the front wheel assembly and the rear wheel assembly responsive to a user engaging the actuator.

A6.1 The knee board of paragraph A6, wherein the actuator is positioned relative to the gripping regions in a position for a user to grasp the actuator with at least one of the user's hands.

A6.2 The knee board of any of paragraphs A6-A6.1, wherein the actuator is positioned forward of the gripping regions in a position for a user to grasp both the actuator and the gripping regions.

A6.3 The knee board of any of paragraphs A6-A6.1, wherein the actuator is positioned rearward of the gripping regions in a position for a user to grasp both the actuator and the gripping regions.

A7 The knee board of any of paragraphs A-A6.3, wherein the body includes a contoured upper surface shaped to receive the user's knees, wherein the contoured upper surface defines the knee support region.

A7.1 The knee board of paragraph A7, wherein the knee support region is generally U-shaped and includes a left knee support region and a right knee support region.

A8 The knee board of any of paragraphs A-A7, wherein the body includes a frame assembly including a plurality of interconnected frame members.

A8.1 The knee board of paragraph A8, wherein the frame members include tubular frame members.

A9 The knee board of any of paragraphs A-A7, wherein the body includes a unitary frame that defines the forward region and the rear region.

A9.1 The knee board of paragraph A-A9, wherein the body is molded of plastic.

A10 The knee board of any of paragraphs A-A9, wherein the body includes a planar rigid member.

A10.1 The knee board of paragraph A10, wherein the planar rigid member is constructed of wood.

A10.2 The knee board of any of paragraphs A10-A10.1, wherein the knee support region is constructed of a resilient material configured to cushion the user's knees, and wherein the resilient material is coupled to the planar rigid member.

A11 The knee board of any of paragraphs A-A10.1, wherein the knee support region is constructed of a resilient material configured to cushion the user's knees.

A12 The knee board of any of paragraphs A-A11, wherein at least one of the front wheel assembly and the rear wheel assembly includes at least one caster.

A13 The knee board of any of paragraphs A-A12, wherein at least one of the front wheel assembly and the rear wheel assembly includes at least one truck.

A14 The knee board of any of paragraphs A-A13, wherein the front wheel assembly includes two wheels.

A15 The knee board of any of paragraphs A-A14, wherein the open kick region is perimetrically bound by the body by at least 45 degrees.

A16 The knee board of any of paragraphs A-A14, wherein the open kick region is perimetrically bound by the body by at least 90 degrees.

A17 The knee board of any of paragraphs A-A14, wherein the open kick region is perimetrically bound by the body by between about 90 degrees and about 180 degrees, inclusive.

A18 The knee board of any of paragraphs A-A17, wherein the gripping member includes a handlebar.

A19 The knee board of any of paragraphs A-A17, wherein the gripping member includes a steering wheel.

A20 The knee board of any of paragraphs A-A19, wherein the knee board is a children's knee board sized for use by a child user.

A21 The knee board of any of paragraphs A-A20, wherein the knee board is a recreational knee board, and optionally a sporting knee board.

A22 A method of riding the knee board of any of paragraphs A-A19, the method comprising:
 kneeling on the knee support region with a knee;
 extending a foot through the open kick region; and
 kicking the ground surface to propel the knee board and the user along the ground surface.

A22.1 The method of paragraph A22, wherein the method includes extending the foot through the open kick region from a position that is laterally adjacent to the knee.

A22.2 The method of paragraph A22 or A22.1, wherein the method includes extending the foot through the open kick region from a position that is forward of the knee.

B A method of riding a knee board on a ground surface, the method comprising:
 kneeling with a knee on a knee support region of the knee board;
 extending a foot through an open kick region that is laterally adjacent to the knee support region; and
 kicking the ground surface to propel the knee board along the ground surface.

B1 The method of paragraph B, wherein the knee board is the children's knee board of any of paragraphs A-A19.

B2 The method of paragraph B or B1, wherein the method includes extending the foot through the open kick region from a position that is laterally adjacent to the knee.

B2.1 The method of paragraph B2, wherein the method includes extending the foot through the open kick region from a position that is forward of the knee.

In the event that the provisional patent application that is incorporated by reference herein defines or uses a term in a manner that is inconsistent with the non-incorporated disclosure of the present application, the non-incorporated disclosure of the present application shall control and the term or terms as used therein only controls with respect to the provisional patent application in which the term or terms are defined or used.

The disclosure set forth above encompasses multiple distinct inventions with independent utility. While each of these inventions has been disclosed in a preferred form or method, the specific alternatives, embodiments, and/or methods thereof as disclosed and illustrated herein are not to be considered in a limiting sense, as numerous variations are possible. The present disclosure includes all novel and non-obvious combinations and subcombinations of the various elements, features, functions, properties, methods and/or steps disclosed herein. Similarly, where any disclosure above or claim below recites "a" or "a first" element, step of a method, or the equivalent thereof, such disclosure or claim should be understood to include one or more such elements or steps, neither requiring nor excluding two or more such elements or steps.

Inventions embodied in various combinations and subcombinations of features, functions, elements, properties, steps and/or methods may be claimed through presentation of new claims in a related application, Such new claims, whether they are directed to a different invention or directed to the same invention, whether different, broader, narrower, or equal in scope to the original claims, are also regarded as included within the subject matter of the present disclosure.

The invention claimed is:

1. A recreational knee board for riding in a kneeling position on a ground surface, the knee board comprising:
 a generally planar body sized and shaped to receive a user in a kneeling position, the generally planar body having a longitudinal axis and including a top surface and an bottom surface, and a forward region and a rear region extending along the longitudinal axis, wherein the rear region includes a left knee support region on the top surface of the generally planar body and a right knee support region on the top surface of the generally planar body and laterally spaced from the left knee support region, the left and right knee support regions configured to support the knees of the user on the top surface of the generally planar body, and wherein the generally planar body at least partially defines an open kick region between the left knee support region and the right knee support region, the open kick region positioned to permit a user to extend a foot of one of the user's legs between the left and right knee support regions and through the open kick region to contact the ground surface while maintaining the knee of the other of the user's legs on the respective knee support region;
 a front wheel assembly pivotally coupled to the forward region of the generally planar body and including at least one wheel configured to rotate about a rotating axis;
 a left rear wheel assembly coupled to the rear region of the generally planar body and including at least one wheel;
 a right rear wheel assembly coupled to the rear region of the generally planar body and including at least one wheel; and
 a steering assembly operatively coupled to the front wheel assembly and including a gripping member, wherein the gripping member includes gripping regions positioned adjacent the top surface of the generally planar body and configured for a user to grasp the gripping regions with the user's hands when at least one of the user's knees is supported by the knee support region, wherein the steering assembly is configured to pivot the front wheel assembly about a pivot axis responsive to user-imparted forces on the gripping member, wherein the steering assembly includes a straight configuration, in which the rotating axis of the front wheel assembly is perpendicular to the longitudinal axis of the generally planar body, and a range of turning configurations, in which the rotating axis of the front wheel assembly is not perpendicular to the longitudinal axis of the generally planar body.

2. The knee board of claim 1, wherein the rotating axis is offset from and does not intersect the pivot axis.

3. The knee board of claim 1, wherein the pivot axis is forward of the rotating axis when the front wheel assembly is in the straight configuration.

4. The knee board of claim 1, wherein the gripping regions are forward of the rotating axis when the front wheel assembly is in the straight configuration.

5. The knee board of claim 1, wherein the steering assembly includes a steering column that extends through the generally planar body from the gripping member to the front wheel assembly.

6. The knee board of claim 1, further comprising:
   a brake assembly operatively coupled to the steering assembly, the brake assembly including an actuator positioned to be selectively engaged by a user, wherein the brake assembly is configured to restrict rotation of the at least one wheel of the front wheel assembly responsive to a user engaging the actuator.

7. The knee board of claim 6, wherein the actuator is positioned relative to the gripping regions in a position for a user to grasp the actuator with at least one of the user's hands.

8. The knee board of claim 6, wherein the actuator is positioned forward of the gripping regions in a position for a user to grasp both the actuator and the gripping regions.

9. The knee board of claim 1, wherein the generally planar body includes a unitary frame that defines the forward region and the rear region.

10. The knee board of claim 1, wherein the left and right knee support regions are constructed of a resilient material configured to cushion the user's knees, and wherein the resilient material is coupled to the top surface of the generally planar body.

11. The knee board of claim 1, wherein the open kick region is perimetrically bound by the generally planar body by at least 90 degrees.

12. The knee board of claim 1, wherein the open kick region is perimetrically bound by the generally planar body by between about 90 degrees and about 180 degrees, inclusive.

13. The knee board of claim 1, wherein the open kick region further extends forward of the left and right knee support regions.

14. The knee board of claim 1, wherein the generally planar body has a generally rounded triangular shape with a generally U-shaped recess extending into the rear region of the generally planar body and defining at least a portion of the open kick region.

15. A recreational knee board for riding in a kneeling position on a ground surface, the knee board comprising:
   a generally planar body sized and shaped to receive a user in a kneeling position, the generally planar body having a longitudinal axis and including a top surface and a bottom surface, and a forward region and a rear region extending along the longitudinal axis, wherein the rear region includes a left knee support region on the top surface of the generally planar body and a right knee support region on the top surface of the generally planar body and laterally spaced from the left knee support region, the left and right knee support regions constructed of a resilient material and configured to support the knees of the user on the top surface of the generally planar body, and wherein the generally planar body at least partially defines an open kick region between the left knee support region and the right knee support region, the open kick region perimetrically bound by the generally planar body by at least 90 degrees and positioned to permit a user to extend a foot of one of the user's legs between the left and right knee support regions and through the open kick region to contact the ground surface while maintaining the knee of the other of the user's legs on the respective knee support region;
   a front wheel assembly pivotally coupled to the forward region of the generally planar body and including at least one wheel configured to rotate about a rotating axis;
   a left rear wheel assembly coupled to the rear region of the generally planar body and including at least one wheel;
   a right rear wheel assembly coupled to the rear region of the generally planar body and including at least one wheel;
   a steering assembly operatively coupled to the front wheel assembly and including a gripping member, wherein the gripping member includes gripping regions positioned adjacent the top surface of the generally planar body and configured for a user to grasp the gripping regions with the user's hands when at least one of the user's knees is supported by the knee support region, wherein the steering assembly is configured to pivot the front wheel assembly about a pivot axis responsive to user-imparted forces on the gripping member, wherein the steering assembly includes a straight configuration, in which the rotating axis of the front wheel assembly is perpendicular to the longitudinal axis of the generally planar body, and a range of turning configurations, in which the rotating axis of the front wheel assembly is not perpendicular to the longitudinal axis of the generally planar body; and
   a brake assembly operatively coupled to the steering assembly, the brake assembly including an actuator positioned to be selectively engaged by a user, wherein the brake assembly is configured to restrict rotation of the at least one wheel of the front wheel assembly.

16. The knee board of claim 1, wherein the left and right knee support regions are constructed of a resilient material configured to cushion the user's knees, and wherein the resilient material is coupled to the top surface of the generally planar body.

17. The knee board of claim 6,
   wherein the generally planar body defines a hole extending through the generally planar body from the top surface to the bottom surface; and
   wherein the actuator of the brake assembly includes a lever arm that extends through the hole from the top surface of the generally planar body to the bottom surface of the generally planar body.

18. The knee board of claim 6, wherein the actuator of the brake assembly includes a lever arm that is configured to pivot from the bottom surface of the generally planar body.

19. The knee board of claim 15, wherein the left and right knee support regions are constructed of a resilient material configured to cushion the user's knees, and wherein the resilient material is coupled to top surface of the generally planar body.

20. The knee board of claim 15, wherein the steering assembly includes a steering column that extends through the generally planar body from the gripping member to the front wheel assembly, and further wherein the actuator of the brake assembly includes a lever arm that extends through the generally planar body.

21. The knee board of claim 20, wherein the lever arm is configured to pivot from the bottom surface of the generally planar body.

22. The knee board of claim 1, wherein the steering assembly includes a steering column that extends through the generally planar body from the gripping member to the front wheel assembly to space the gripping member and the rotating axis of the front wheel assembly approximately equal distances away from the generally planar body.

23. The knee board of claim 15, wherein the steering assembly includes a steering column that extends through the generally planar body from the gripping member to the front wheel assembly to space the gripping member and the rotating axis of the front wheel assembly approximately equal distances away from the generally planar body.

24. The knee board of claim 1, wherein the range of turning configurations of the front wheel assembly is not greater than 180°.

25. The knee board of claim 15, wherein the range of turning configurations of the front wheel assembly is not greater than 180°.

* * * * *

UNITED STATES PATENT AND TRADEMARK OFFICE
CERTIFICATE OF CORRECTION

PATENT NO. : 8,562,004 B2  
APPLICATION NO. : 12/581738  
DATED : October 22, 2013  
INVENTOR(S) : Scott H. Stillinger and Kathryn Kelsey Anne Stillinger It is certified that error appears in the above-identified patent and that said Letters Patent is hereby corrected as shown below:

In the Specification

Column 18, lines 32-33, in the phrase "surface and an bottom," please delete "an" and insert --a-- therefor.

In the Claims

Column 20, line 60, in the phrase "coupled to top surface" please insert --the-- after "to" and before "top".

Signed and Sealed this  
Fourth Day of March, 2014

Michelle K. Lee  
*Deputy Director of the United States Patent and Trademark Office*